US008942921B1

(12) United States Patent
Unnikrishnan

(10) Patent No.: US 8,942,921 B1
(45) Date of Patent: Jan. 27, 2015

(54) DISPLAYING DYNAMIC ENTERTAINMENT INFORMATION ON MARQUEES IN STREET-LEVEL IMAGERY

(75) Inventor: Sreejit Unnikrishnan, Bangalore (IN)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 13/454,243

(22) Filed: Apr. 24, 2012

(51) Int. Cl.
G09G 5/377 (2006.01)
G06F 17/00 (2006.01)
G01C 21/26 (2006.01)

(52) U.S. Cl.
USPC .......................................... 701/454; 345/634

(58) Field of Classification Search
None
See application file for complete search history.

(56) References Cited

U.S. PATENT DOCUMENTS

| | | |
|---|---|---|
| 6,453,056 B2 | 9/2002 | Laumeyer et al. |
| 6,956,573 B1 | 10/2005 | Bergen et al. |
| 7,127,068 B2 | 10/2006 | Sundaravel et al. |
| 7,359,797 B2 | 4/2008 | Dorfman et al. |
| 8,131,118 B1 | 3/2012 | Jing et al. |
| 8,364,393 B2 * | 1/2013 | DeLuca et al. ................. 701/409 |
| 8,385,591 B1 | 2/2013 | Anguelov et al. |
| 8,447,136 B2 | 5/2013 | Ofek et al. |
| 8,472,664 B1 | 6/2013 | Jing et al. |
| 8,515,207 B2 * | 8/2013 | Chau ............................. 382/294 |
| 8,593,485 B1 | 11/2013 | Anguelov et al. |
| 8,605,133 B2 | 12/2013 | Lampotang et al. |
| 8,666,112 B1 | 3/2014 | Jing et al. |
| 2003/0191694 A1 | 10/2003 | Vonfeldt et al. |
| 2005/0162523 A1 | 7/2005 | Darrell et al. |
| 2007/0173956 A1 | 7/2007 | Koch et al. |
| 2007/0255725 A1 | 11/2007 | McCoach |
| 2008/0002916 A1 | 1/2008 | Vincent et al. |
| 2010/0004995 A1* | 1/2010 | Hickman .................... 705/14.58 |
| 2010/0118025 A1* | 5/2010 | Smith et al. .................... 345/418 |
| 2010/0293173 A1* | 11/2010 | Chapin et al. ................. 707/759 |
| 2011/0143779 A1* | 6/2011 | Rowe et al. ................. 455/456.3 |
| 2011/0267369 A1* | 11/2011 | Olsen ............................ 345/634 |
| 2013/0069944 A1* | 3/2013 | Altman et al. ................ 345/420 |

(Continued)

FOREIGN PATENT DOCUMENTS

EP 2315075 A1 4/2011
WO 2013181032 A2 12/2013

OTHER PUBLICATIONS

Pages from gawker.com website, article entitled "What Movies Are Currently Playing on Google Street View?" accessed Apr. 24, 2012, 10:28 a.m. (6 pages).

(Continued)

Primary Examiner — James Trammell
Assistant Examiner — Demetra Smith-Stewart
(74) Attorney, Agent, or Firm — Lerner, David, Littenberg, Krumholz & Mentlik, LLP

(57) ABSTRACT

An apparatus provides street-level images that include entertainment information. The apparatus may include a memory that stores at least one street-level image that includes a sign for displaying entertainment information. The sign may be located anywhere in the street-level image and the apparatus may be operative to identify a geometric shape associated with the sign. The geometric shape may define where entertainment information is to be displayed. Moreover, the apparatus may be operative to define different regions within the geometric shape such that the different regions display different types of entertainment information. Moreover, the entertainment information may be selectable by a user such that selection of the entertainment information displays a graphic, audiovisual file, or other media to the user regarding the selected entertainment information.

20 Claims, 8 Drawing Sheets

(56) References Cited

U.S. PATENT DOCUMENTS

| | | |
|---|---|---|
| 2013/0155181 A1 | 6/2013 | Williams et al. |
| 2013/0223744 A1* | 8/2013 | Ramanujapuram et al. .. 382/182 |
| 2014/0180571 A1* | 6/2014 | Kimchi et al. ................ 701/409 |

OTHER PUBLICATIONS

Aude Oliva and Antonio Torralba, Building the Gist of a Scene: The Role of Global Image Features in Recognition; Progress in Brain Research, vol. 155, 2006 (16 pages).

Hartmut Neven, Geordie Rose and William G. MaCready, Image Recognition With an Adiabatic Quantum Computer: I. Mapping to Quadratic Unconstrained Binary Optimization; Apr. 28, 2008, pp. 1-7.

http://www.gigapan.org/index.php, printed May 4, 2009.

http://www.ogleearth.com/2007/10/earthmine_or_th.html, printed May 4, 2009.

ICCV 2005 Computer Vision Contest, http:/research.microsft.com/en-us/um/people/szelisk/VisionContest . . . , printed May 21, 2012.

Masakatsu Kourogi, Takeshi Kurata, Katsuhiko Sakaue, A Panorama-based Method of Personal Positioning and Orientation and Its Real-time Applications for Wearable Computers, ISWC2001 in Zurich, Switerland, pp. 107-114, 2001.

Masakatsu Kourogi, Takeshi Kurata, Katsuhiko Sakaue, Yoichi Muraoka, Improvement of panorama-based annotation overlay using omnidirectional vision and inertial sensors, 2000, pp. 183-184, IEEE.

* cited by examiner

DISPLAYING DYNAMIC ENTERTAINMENT INFORMATION ON MARQUEES IN STREET-LEVEL IMAGERY

BACKGROUND

Technology today allows a user to electronically retrieve and view an online map for a specified geographic location. For example, the user may visit a website using an Internet browser and the website may provide an interface for specifying an address or other geographic identifier. Using the website's interface, the user may enter a postal address, such as "123 Main Street, Anytown, USA" and the website may display a map corresponding to the entered postal address. The displayed map may be depicted as a two-dimensional bitmap image or the website may display a map using available satellite imagery.

The user may then request that the website display a "street-level" view of the specified address or geographic location. In this regard, the website may display an image, such as a digital photograph, of the specified address as if the user was standing near or in front of the specified address or geographic location. Thus, using the example above of "123 Main Street," a street-level view of this address may be a digital photograph of a building (such as a business storefront, apartment building, etc.) located at the address of "123 Main Street."

While the street-level image presented to the user is typically a digital photograph of the specified address or geographic location, the digital photograph often represents the building photographed at a certain point of time. For example, the street-level image may be several days, months, or even years old.

Furthermore, these outdated images make it difficult for a user to know what is currently happening at a given location. This shortcoming is especially problematic should a user desire to know time-sensitive information, such as whether an entertainment venue or performing arts center is hosting a given event at the time the user views the street-level image. For example, should a user desire to know whether a movie theatre is playing a given movie, the street-level image of the movie theater may display entertainment information that is incorrect and outdated. Hence, a user often cannot rely on street-level images to provide up-to-date or current information about a venue.

SUMMARY

To address these and other problems, this disclosure provides for an apparatus for providing street-level images of entertainment information. In one example, the apparatus includes a memory storing at least one street-level image of an entertainment venue and a processor in communication with the memory. The processor may be operative to receive location information for a geographic location corresponding to a geographic location of a sign displayable within the at least one street-level image and identify a first region within the displayable sign where first entertainment information is displayable, the first entertainment information relating to a performance being performed at the geographic location. The processor may also be operative to receive second entertainment information for display within the first region, wherein the second entertainment information is more current than the first entertainment information, and provide the at least one street-level image of the entertainment venue to a client device, wherein the at least one street-level image includes the second entertainment information displayed within the identified first region within the displayable sign.

In another example of the apparatus, the second entertainment information is derived from user-provided entertainment information.

In a further example of the apparatus, the processor is further operative to identify a second region with the displayable sign where third entertainment information is displayable, receive the third entertainment information for display within the second region, and provide the at least one street-level image of the entertainment venue to the client device that includes the third entertainment information displayed within the identified second region within the displayable sign, wherein the second entertainment information and the third entertainment information are different.

In yet another example of the apparatus, the memory is further operative to store a geometry that defines the first region, and the processor is further operative to identify the first region based on the stored geometry.

In yet a further example of the apparatus, the processor is further operative to identify the first region based on at least one image recognition technique.

In another example of the apparatus, a portion of the second entertainment information is selectable by a user, the selectable portion of the second entertainment information being associated with a displayable webpage.

In a further example of the apparatus, the second entertainment information includes at least one performance date and at least one performance time for a performance being held at the entertainment venue displayable within the street-level image.

In yet another example of the apparatus, the second entertainment information is replaceable with third entertainment information, wherein the third entertainment information is different than the second entertainment information.

In yet a further example of the apparatus, the processor is further operative to replace the first entertainment information with the second entertainment information at a predetermined time interval.

In another example of the apparatus, the second entertainment information is received from a first entertainment information source, and the processor is further operative to replace the second entertainment information with third entertainment information received from a second entertainment information source, wherein the second entertainment information source provides identification information different than identification information provided by the first entertainment information source.

In a further example of the apparatus, the displayable sign is a movie marquee, and the second entertainment information for display is movie information for a movie being shown at a movie theatre associated with the movie marquee.

In yet another example of the apparatus, the second entertainment information includes a hyperlink to a webpage for purchasing tickets to a performance associated with the second entertainment information.

In yet a further example of the apparatus, the processor is further operative to replace the first entertainment information with the second entertainment based on a comparison of the first entertainment information with the second entertainment information.

In another example of the apparatus, the first entertainment information is replaced with the second entertainment information when the processor determines that the second entertainment information is different than the first entertainment information.

In a further example of the apparatus, the first entertainment information is replaced when a request to replace the first entertainment information is received.

In yet another example of the apparatus, the second entertainment information is derived from a social network.

An apparatus for displaying a street-level image that includes current entertainment information is also provided. In one example, the apparatus includes a memory operative to store a street-level image, the street-level image including a displayable sign having a region for displaying first entertainment information, and a processor in communication with the memory. The processor may be operative to receive the street-level image based on a request from a user to display the street-level image and receive second entertainment information for display within the first region, wherein the second entertainment information includes more current entertainment information than the first entertainment information. The processor may also be operative to display the street-level image with the second entertainment information displayed in the region of the displayable sign, the second entertainment information having replaced the first entertainment information.

In another example of the apparatus, the second entertainment information is derived from a social network.

A method for displaying a street-level image that includes current entertainment information is also provided. In one example, the method includes storing, in a memory, a street-level image based on a request from a user to display the street-level image, wherein the street-level image includes a displayable sign having a region for displaying first entertainment information, and receiving, with a processor in communication with the memory, second entertainment information for display within the first region, wherein the second entertainment information includes more current entertainment information than the first entertainment information. The method may also include displaying the street-level image with the second entertainment information displayed in the region of the displayable sign, the second entertainment information having replaced the first entertainment information.

In another example of the method, the second entertainment information is derived from a social network.

DETAILED DESCRIPTION

The present disclosure relates to a dynamic entertainment information system, and in particular, to a dynamic entertainment information system that may incorporate real-time or current entertainment information into a street-level image requested by a user. The user may request the street-level image user any type of client device, such as a mobile device, desktop computer, or other type of client device. The dynamic entertainment information system may retrieve or receive entertainment information from a variety of sources, and this entertainment information may be incorporated into a specific portion of a street-level image, such as the marquee of a movie theatre, at the time the street-level image is requested by the user.

Figure 1:
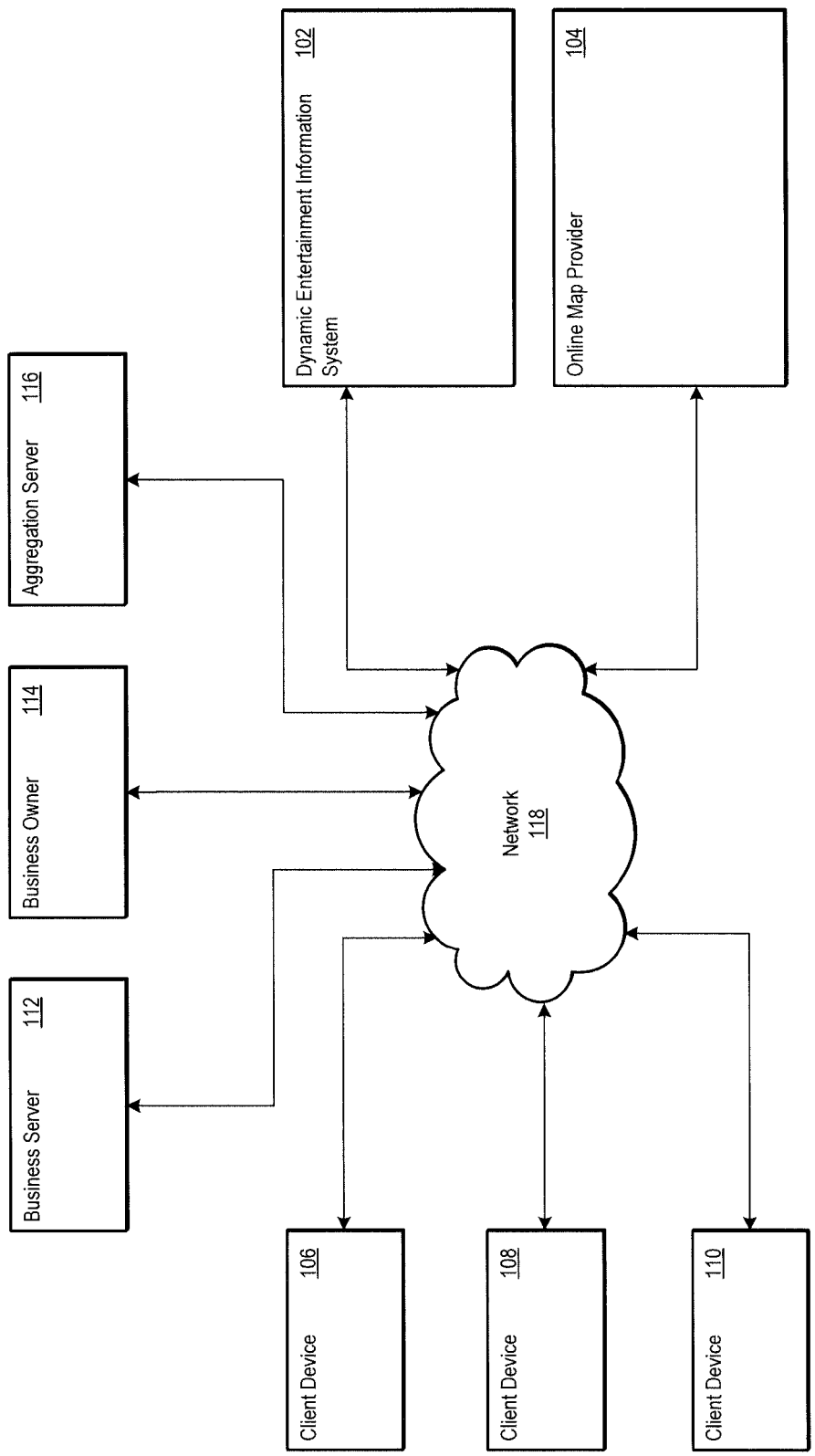
FIG. 1 illustrates one example of an apparatus for providing street-level images of marquee information according to aspects of the disclosure.

FIG. 1 illustrates one example of a dynamic entertainment information system 102 communicating with other devices and/or systems to provide dynamic entertainment information in street-view images. The dynamic entertainment information system 102 may communicate with other devices or systems via a network 118. In one embodiment, the dynamic entertainment information system 102 may communicate with an online map provider 104, and various sources of entertainment information 112-116.

The online map provider may be configured to provide digital images of maps to one or more client devices 106-110 via the network 118. The network 118 may be any type of network such as a wired network, a wireless network, or a combination of wired and wireless networks. Examples of wired networks include Ethernet, the Internet, token ring networks, a Local Area Network ("LAN"), or other such wired networks. Examples of wireless networks include 802.11b/g/n, Bluetooth, Wi-Max, and other such wireless networks.

The client devices 106-110 may be any type of client device, such as a desktop computer, a mobile device, such as a laptop, a smartphone, a Personal Display Assistant ("PDA"), a tablet computer, netbook, or other such mobile device. The online map provider 104 may provide an interface, such as a website, for providing the digital images of the maps to the client devices 106-110. The website may include one or more webpages written in one or more computer-programming and/or scripting languages, such as the Hypertext Markup Language ("HTML"), the Extensible Markup Language ("XML"), JavaScript, Perl, PHP, or any other computer-programming and/or scripting language.

The client devices 106-110 may include software for accessing the website of the online map provider 104, such as an Internet browser. Examples of Internet browsers include Microsoft Internet Explorer, Google Chrome, and Mozilla Firefox. The Internet browser may also be a mobile Internet browser for use on a smartphone. Examples of mobile Internet browsers include the Google Browser for the Android operating system, Opera Mobile, and other such mobile browsers.

The online map provider 104 may also provide a dedicated application for accessing the digital images of the maps. For example, the online map provider 104 may provide a mobile application intended for use on a mobile device for accessing the digital images of the maps.

Using the Internet browser, a user of a client devices may enter a Uniform Resource Locator ("URL") of the website provided by the online map provider 104. Alternatively, where a dedicated application is provided to the user, the user may simply execute the dedicated application to begin communications with the online map provider 104.

The user may then provide a postal address or other geographic identifier to the online map provider 104. For example, the user may provide the postal address of "123 Main Street, Anytown, USA" or a geographic identifier such as "New York City, New York." In response, the online map provider 104 may transmit a digital image of a map corresponding to the entered postal address or the geographic identifier to the Internet browser or dedicated application for display to the user. The digital image displayed to the user may be any type of digital image, such as a vector-based image, a bitmap image, or other such digital image. The digital image may be compressed or uncompressed. In one embodiment, the digital image may be a two-dimensional, bitmap image representing the geographic location of the provided postal address or geographic identifier.

Once the user receives the digital image of the map, the user may adjust the perspective of the displayed digital image. For example, the user may increase an adjustable zoom level. The adjustable zoom level may increase or decrease the amount of geographical area displayed in the map. An increase in the zoom level may decrease the amount of geographical area displayed in the map. A decrease in the zoom level may increase the amount of geographical area displayed in the map.

Moreover, the user may select an option to view a street-level view of the geographic area displayed in the map. In other words, the user may view the geographic area displayed in the map as if the user was physically present at the displayed area. The street-level view of the geographic area may display a digital photograph of the geographic area.

Using one or more of the client devices 106-110, a user may desire to view a street-level image of an entertainment venue or a performing arts center. More particularly, a user may desire to know what performances are being performed at the entertainment venue or the performing arts center. In conjunction with the dynamic entertainment information system 102, a user may view this type of information.

Initially, the user may provide a postal address or geographic identifier for the entertainment venue or performing arts center to the online map provider 104. For example, a user may provide a specific postal address of "456 Main Street, Anytown, USA" or a geographic identifier such as "the Acme movie theatre in Anytown, USA." The online map provider 104 may then transmit a digital image of the map where the entertainment venue or performing arts center is geographically located.

Using the client device 106-110, the user may then request a street-level view of the entertainment venue or performing arts center. In response, the online map provider 104 may provide a digital photograph of the entertainment venue or performing arts center with entertainment information regarding the entertainment being performed at the entertainment venue or performing arts center. The entertainment information may be presented in a particular portion of the digital photograph, such as in a marquee or billboard used by the entertainment venue or performing arts center to inform the public about the entertainment being performed.

Moreover, the entertainment information that is provided to the user may be current or relatively up-to-date entertainment. In other words, the entertainment information that is displayed in the street-level image may inform the user as to the entertainment that is currently being performed at the entertainment venue or performing arts center. For example, where the entertainment venue is a movie theatre, the entertainment information may include the movies currently being shown at the movie theatre and the times at which the movie theatre plays those movies. As another example, the performing arts center may be an auditorium, and the entertainment information may include the type of performance being performed (e.g., a ballet) and the times at which the performance is being performed.

To provide such up-to-date or current entertainment information, the online map provider 104 may communicate with the dynamic entertainment information system 102. Although shown as separate entities in FIG. 1, it should be understood that the online map provider 104 and the dynamic entertainment information system 102 may be the same entity or distributed across multiple entities. For example, the dynamic entertainment information system 102 and the online map provider 104 may share the same physical hardware or may be distributed across multiple pieces of different hardware. The online map provider 104 may communicate with the dynamic entertainment information 102 through a network, such as the network 118.

To provide the online map provider 104 with up-to-date or current entertainment information, the dynamic entertainment information system 102 may communicate with a variety of entertainment sources. In one embodiment, an entertainment source may be a user of a client device 106-110. The user may provide entertainment information to the dynamic entertainment information system 102 for a given entertainment venue or performing arts center. For example, while the user is viewing a street-level image of an entertainment venue or performing arts center, the user may be asked to provide current or more recent entertainment information. The provided entertainment information may be new to the street-level image, such as where the street-level image has not been previously viewed, or the provided entertainment information may replace previously provided entertainment information. In addition, the user may be asked to identify where the entertainment information is to be displayed in the street-level image. As discussed with reference to FIG. 4, a user may define a portion of the street-level image in which the entertainment information is displayed.

Another type of entertainment information source may be a digital or electronic source of entertainment information. For example, the entertainment venue or performing arts center may maintain a website accessible via a business server 112. The website may be accessible to the public such that a user using an Internet browser may view the information residing on the website. The website may provide information regarding the entertainment venue or performing arts center, such as which performances are being performed at what times. The dynamic entertainment information system 102 may automatically retrieve this information from the business server 112, and may incorporate this entertainment information into street-level images of the entertainment venue or performing arts center.

The dynamic entertainment information system 102 may use various techniques for retrieving and parsing the entertainment information from the business server 112. For example, the dynamic entertainment information system 102 may use an Internet robot to scan the webpages of the business server 112 for relevant entertainment information. The Internet robot may be a software application, such as an automated script, that fetches, analyzes and organizes information retrieved from a web server. The Internet robot may be programmed or scripted to search for specific entertainment information, such as performance group names, scheduling information, opening and/or closing times, a starting time (e.g., such as the starting time for when a movie starts), or other such entertainment information. The Internet robot may also use other techniques for identifying entertainment provided by the business server 112, such as pattern recognition, keyword identification, or other such techniques.

Yet another type of entertainment information source may be the business owner 114 for a given entertainment venue. For example, when a business owner 114 requests a street-level image of an entertainment venue (e.g., an entertainment venue, a performing arts center, etc.), the online map provider 104 and/or the dynamic entertainment information system 102 may prompt the business owner 114 to provide entertainment information for the given entertainment venue.

In one embodiment, the prompt may be provided to a user regardless of whether the user is the business owner of the entertainment venue. In this embodiment, when the prompt is selected, the online map provider 104 and/or the dynamic entertainment information system 103 may request that the user provide identification information to establish that the user is, in fact, the business owner of the entertainment venue. For example, the online map provider 104 and/or the dynamic entertainment information system 102 may request a phone number, an operator's license, a tax identification number, or other identifier by which to verify that the user is, in fact, the business owner. When the online map provider 104 and/or the dynamic entertainment information system 102 establishes that the user is the business owner, the user may then provide entertainment information, which may be retained by the dynamic entertainment information system 102 for later use in providing up-to-date or current entertainment information for the given entertainment venue.

In another embodiment, the prompt may be provided to the business owner after the business owner provides identification information authenticating that the business owner is, in fact, an owner (or manager, Chief Operating Officer, entertainment agent, or other authoritative person, etc.) of the entertainment venue. In this embodiment, the business owner may first provide login information (e.g., a user name and password), and when the online map provider 104 and/or dynamic entertainment information 102 verifies that the login information is correct, the business owner may then be prompted to provide up-to-date or current entertainment information for a given entertainment venue. In summary, regardless of whether the prompt is provided to the user before the user is authenticated as a business owner of an entertainment venue, the business owner 114 may be a source of entertainment information which the dynamic entertainment information system 102 may leverage to maintain up-to-date or current entertainment information for a given entertainment venue.

Yet a further type of entertainment information source may be a third-party source, such as an aggregation server 116 in communication with the dynamic entertainment information system 102. The aggregation server 116 may be responsible for collecting entertainment information for one or more entertainment venues. The aggregation server 116 may then provide the collected entertainment information to the dynamic entertainment information system 102. In one embodiment, the aggregation server 116 may provide the entertainment information to the dynamic entertainment information system 102 as the entertainment information becomes available or is updated. In another embodiment, the aggregation server 116 may provide the entertainment information to the dynamic entertainment information system 102 at predetermined time intervals, such as once a week, once a day, once an hour, or at other such time intervals.

Moreover, the entertainment information source may be a social network of users. For example, the social network may facilitate communications among one or more users, and the dynamic entertainment information system 102 may be operative to communicate with the social network to obtain updated or current entertainment information. For example, a user of the social network may communicate the details of an event occurring at a given entertainment venue, and the dynamic entertainment information system 102 may extract or obtain the user-provided details of the event from the social network. The obtaining of the user-provided details may be event driven, such that the dynamic entertainment information system 102 obtains the user-provided details as one or more users provide updates, may occur at predetermined time intervals, or as a combination of both.

Furthermore, the type of entertainment information source may affect whether the dynamic entertainment information system 102 retains the currently stored entertainment information or updates the currently stored entertainment information. In one embodiment, the dynamic entertainment information system 102 may assign priorities to the types of entertainment information sources. For example, the aggregation source 116 may initially provide entertainment information to the dynamic entertainment information system 102. The dynamic entertainment information system 102 may then disseminate the entertainment information provided by the aggregation source 116. Thereafter, a user may attempt to update the entertainment information provided by the aggregation source 116. Depending on whether the dynamic entertainment information system 102 has been configured to assign a greater priority value to the user, the user-provided entertainment information may or may not override the entertainment information provided by the aggregation source 116.

Moreover, the dynamic entertainment information system 102 may employ safeguards to ensure that inaccurate entertainment information from one source does not override or conflict with accurate entertainment information provided by a second source. In this regard, the dynamic entertainment information system 102 may use one or more moderators that review and approve of the entertainment information as it is received. Furthermore, depending on the type of entertainment information source, the dynamic entertainment information system 102 may or may not assign the received entertainment information for moderation. For example, entertainment information received from an aggregation source 116 or a user may be moderated, but the entertainment information received from a business owner 114 or business server 112 may not be moderated. Of course, it is also possible that any entertainment information received is moderated prior to public dissemination by the dynamic entertainment information system 102.

Figure 2:
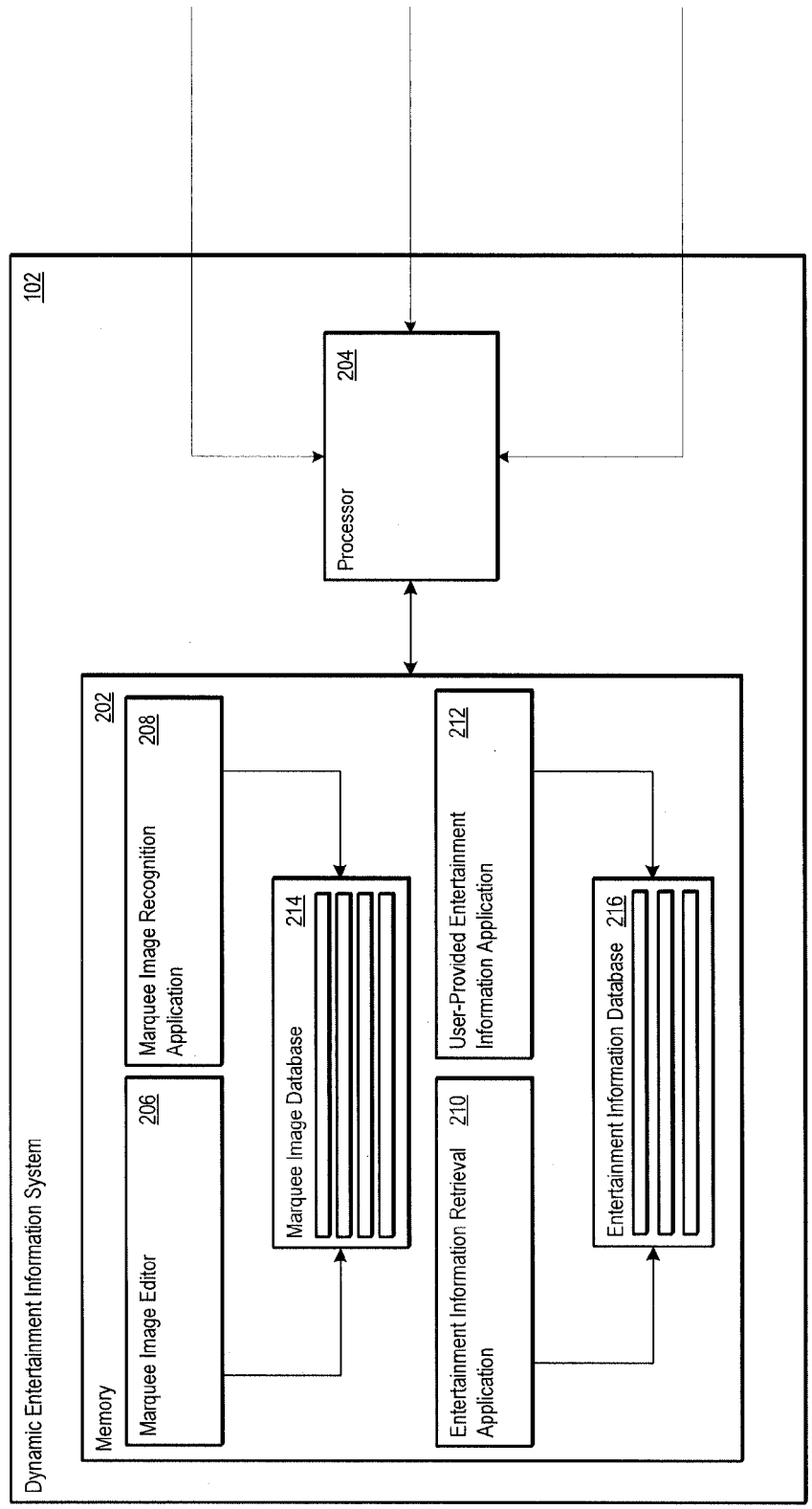
FIG. 2 illustrates one example of a dynamic entertainment information server for providing street-level images of marquee information according to aspects of the disclosure.

FIG. 2 illustrates one example of the dynamic entertainment information system 102. The dynamic entertainment information system 102 may include a memory 202 and a processor 204. The memory 202 may include one or more applications for managing and/or editing entertainment information for various types of entertainment venues. In one embodiment, the memory 202 may include a marquee image editor 206, a marquee image recognition application 208, an entertainment information retrieval application 210 and a user-provided entertainment information application 212. Although this disclosure refers to the "marquee" image editor 206 and the "marquee" image recognition application 208, it should be understood that the term "marquee" may be used interchangeably with any type of signage (e.g., a billboard) that provides entertainment information to the public.

The memory 202 may also include one or more databases for storing entertainment information and entertainment venue information. In one embodiment, the memory 202 may include a marquee image database 214 and an entertainment information database 216.

The memory 202 may be of any type of memory operative to store information accessible by the processor 204, including a computer-readable medium, or other medium that stores data that may be read with the aid of an electronic device, such as a hard-drive, memory card, read-only memory ("ROM"), random-access memory ("RAM"), a digital video disc ("DVD") or other optical disks, as well as other write-capable and read-only memories. Systems and methods may include different combinations of the foregoing, whereby different portions of the applications 206-212 and databases 214-216 are stored on different types of media.

The applications 206-212 may include any set of computer-executable instructions to be executed directly (such as machine code) or indirectly (such as scripts) by the processor 204. For example, the computer-executable instructions may be stored as computer code on a computer-readable medium. In that regard, the terms "instructions," "programs," and "applications" may be used interchangeably herein. The instructions may be stored in object code format for direct processing by the processor 204, or in any other computer language including scripts or collections of independent source code modules that are interpreted on demand or compiled in advance. Functions, methods and routines of these instructions are explained in more detail below.

The databases 214-216 may be retrieved, stored or modified by processor 204 in accordance with the applications 206-212. For instance, although systems and methods disclosed herein are not limited by any particular data structure, the databases 214-216 may be stored in computer registers, as a relational database defined by a table having a plurality of different fields and records, Extensible Markup Language ("XML") documents or flat files. The databases 214-216 may also be formatted in any computer-readable format. Furthermore, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The databases 214-216 may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any conventional processor or microprocessor, such as commercially available central processing units ("CPUs"). Alternatively, the processor may be a dedicated device such as an application-specific integrated circuit ("ASIC"). Although FIG. 2 functionally illustrates the processor 204, the memory 202, and other elements of the dynamic entertainment information system 102 as being within the same block, it will be understood by those of ordinary skill in the art that the processor 204 and the memory 202 may actually comprise multiple processors and memories that may or may not be stored within the same physical housing. For example, the memory 202 may be a hard drive or other storage media located in a housing different from that of the dynamic entertainment information system 102. Accordingly, references to a processor, a server, the dynamic entertainment information system 102, or a computer will be understood to include references to a collection of processors or computers or memories that may or may not operate in parallel. Rather than using a single processor to perform operations described herein, some of the components, such as the marquee image editor 206 or the entertainment information retrieval application 210, may each have their own processor that perform operations related to the component's specific function.

In various aspects described herein, the processor 204 may be located remote from the dynamic entertainment information system 102 and may communicate with one or more components, such as the memory 202, wirelessly over a network (e.g., the network 118). In addition, one or more of the components may be housed within other servers or computers, and the dynamic entertainment information system 102 may receive information from those components. For example, the marquee image editor 206, the marquee image recognition application 208, the entertainment information retrieval application 210, or any other application or database (e.g., databases 214-216) may be housed in another server or computer and the processor 205 may receive information from each of these other servers and/or computers. In other aspects, some of the processes described herein are executed on a processor disposed within the dynamic entertain information system 102 and others by a remote processor housed within a server being monitored, including performing operations for providing entertain information within a requested street-level image.

The dynamic entertain information system 102 may include all of the components normally used in connection with a computer such as a central processing unit (CPU), memory (e.g., RAM and internal hard drives) storing data and instructions to gather and/or make available entertain information, user input devices (e.g., a mouse, keyboard, touch screen and/or microphone), as well as various applications and/or hardware components for gathering entertainment information for a given entertainment venue.

The dynamic entertainment information system 102 may gather entertainment information about a given entertainment venue from a variety of sources (e.g., user-provided entertainment information, from a business owner of an entertainment venue, etc.). In one embodiment, the dynamic entertainment information system 102 may provide marquee image editor 206 operative to define a marquee in a street-level image for displaying entertainment information. The marquee image editor 206 may be accessible by a user at the time the user requests a street-level image.

Figure 3:
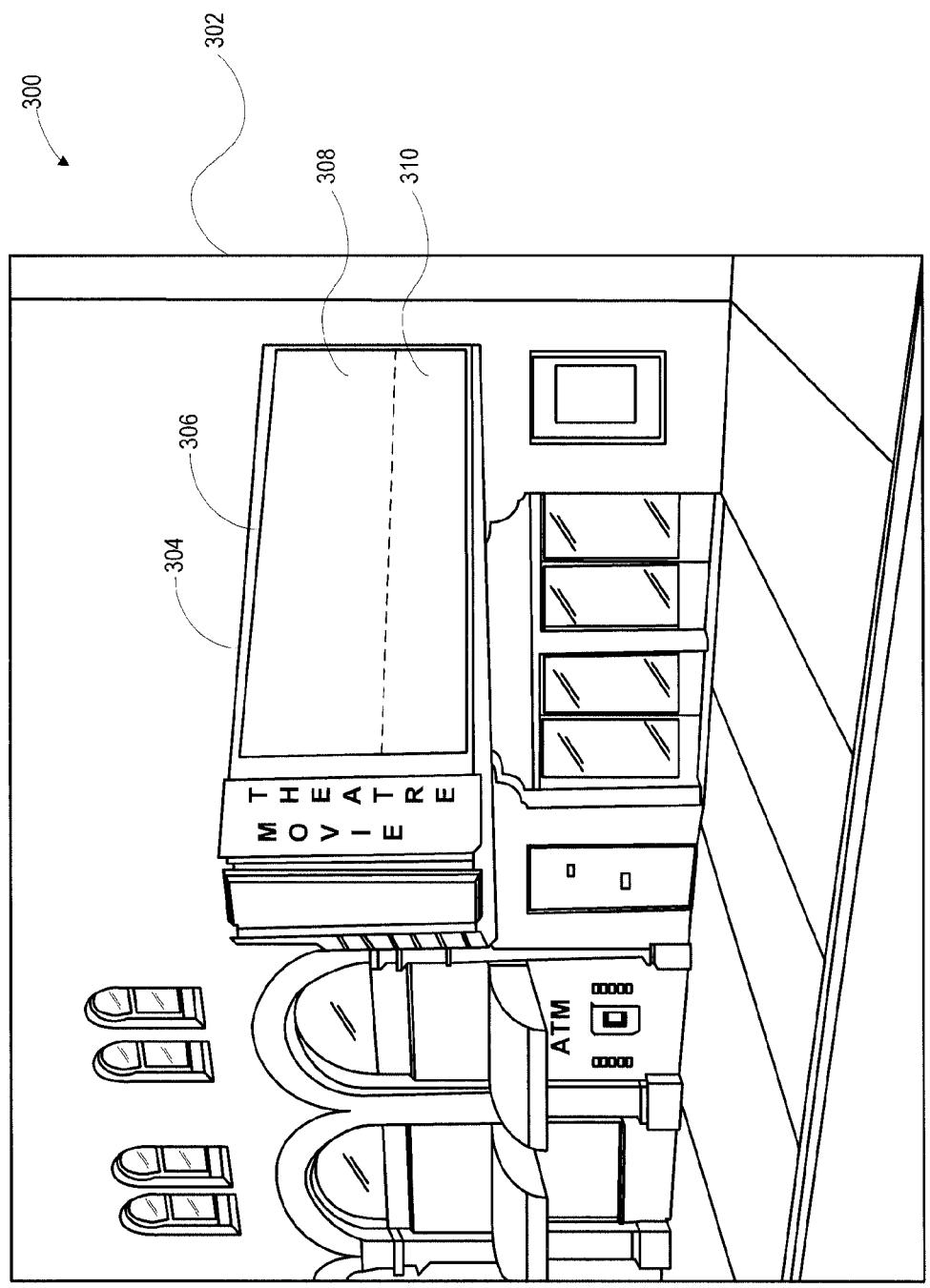
FIG. 3 illustrates an exemplary street-level image that may be provided to a user according to aspects of the disclosure.

FIG. 3 illustrates one example 300 of a street-level image 302 that may be provided to a user. The street-level image may be provided by the online map provider 104 in response to a request to view a street-level image from a user device 106-110. As discussed in more detail below, the street-level image 302 may also be provided to the dynamic entertainment information system 102 when the dynamic entertainment information system 102 updates the street-level image 302 with updated or current entertainment information.

The street-level image 302 of an entertainment venue may have various regions or portions. In one embodiment, the street-level image 302 of the entertainment venue may have a marquee 304. The marquee 304 may have a portion 306 for displaying entertainment information. As shown in FIG. 3, the marquee 304 is currently blank but, as discussed below, the marquee 304 may be populated with entertainment information from a variety of sources. In addition, the portion 306 of the marquee 304 for displaying entertainment information may further be divided into regions, where each region of the marquee 304 displays entertainment information. As shown in FIG. 3, the portion 306 of the marquee 304 for displaying entertainment information may be divided into a first region 308 and a second region 310. Of course, additional regions or a single region is also possible.

The first region 308 and the second region 310 may display different types of entertainment information. For example, the first region 308 may display entertainment information about the movies currently being played at the movie theatre shown in FIG. 3, whereas the second region 310 may display entertainment information about upcoming movies that the movie theatre will show when the movies are released. Of course, other types of entertainment information may also be displayed in either the first region 308 and/or the second region 310.

Figure 4:
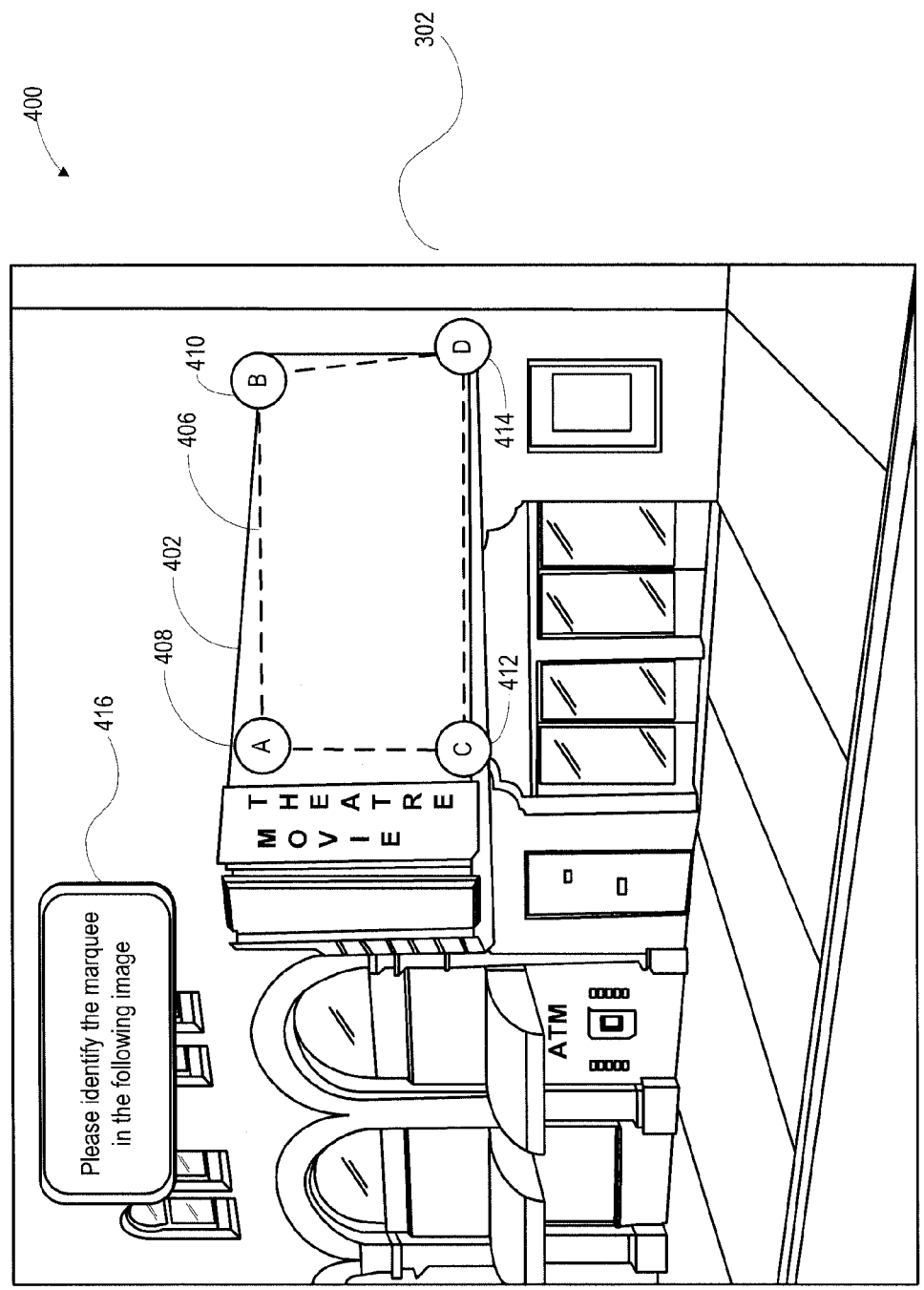
FIG. 4 illustrates a marquee for the dynamic entertainment information server according to aspects of the disclosure.

FIG. 4 illustrates another example 400 of the street-level image 302 where the marquee image editor 206 of the dynamic entertainment information system 102 has been used to identify a marquee 402 in the street-level image 302. In one embodiment, when a user requests to view a street-level image of an entertainment venue, the dynamic entertainment information system 102 may prompt the user to identify whether the street-level image 302 contains a marquee. The dynamic entertainment information system 102 may know that the street-level image 302 contains a marquee because this information may be passed to it by the online map provider 104 or this information may be stored in one or more of the databases 214-216.

In receiving user-provided information regarding a marquee in a street-level image 302, the dynamic entertainment information system 102 may initially display a prompt 416 to the user to identify the marquee 402 or an area in the marquee 402 where entertainment information is to be displayed (e.g., the portion 406 of the marquee 402). To define the portion 406 and/or the marquee 402 where entertainment information is to be displayed, the user may select pixels in the street-level image 402 that represent the vertices of the marquee 402 and/or the portion 406 where entertainment information is to be displayed.

In one embodiment, the vertices may be represented as two-dimensional coordinates corresponding to the height pixel and width pixel that a user selected. Of course, the marquee image editor 206 may also use approximation or other values to represent the part of the street-level image 302 that the user selected as a vertex. In addition, the vertices may be displayed to the user in a more user-friendly format, such as by lettering or numbering. As shown in FIG. 4, the selected vertices 408-414 may be displayed as letters to the user.

The marquee image editor 206 may store the two-dimensional values of the vertices 408-414 in one or more databases, such as the marquee image database 214. In addition, the vertices 408-414 may be associated with the street-level image 302. Using the two-dimensional values of the vertices 408-414, the dynamic entertainment information system 102 may determine a corresponding geometric object in which to display entertainment information. By determining a geometric object from the vertices 408-414, the dynamic entertainment information system 102 may display entertainment information in the marquee 304 of the street-level image 302 that may not normally fit in a real-world situation. Furthermore, knowing the dimensions of the geometric object defined by the vertices 408-414, the dynamic entertainment information system 102 may employ text-processing techniques, such as text scrolling, either automatic or manual, in which to display multiple lines of textual and/or graphical entertainment information.

In addition to leveraging user-provided information to identify marquees or other regions in a street-level image in which to display entertainment information, the dynamic entertainment information system 102 may leverage image recognition techniques. Accordingly, and referring back to FIG. 2, the dynamic entertainment information system 102 may include the marquee image recognition application 208 in communication with the marquee image database 214.

The marquee image recognition application 208 may be operative to identify whether a street-level image contains a marquee or other region for displaying entertainment information. When a marquee is detected, the marquee image recognition application 208 may further be operative to identify and define a geometric shape in the street-level image where entertainment information is displayable. The marquee image recognition application 208 may employ such image recognition techniques as pattern recognition, feature extraction, edge matching, or any other image recognition technique or combination thereof. For example, the marquee image recognition application 208 may identify and define a geometric shape based on the shape or edges of a billboard or marquee, the text present in the marquee or the billboard (which may provide contextual clues that the marquee or billboard is to be used for entertainment information), the type of textual information present in the marquee or billboard, or other such information.

When the marquee image recognition application 208 identifies and defines a geometric shape for displaying entertainment information in a street-level image, the properties of the geometric shape (e.g., height, width, pixel coordinates, etc.) may be stored in the marquee image database 214. For example, the marquee image recognition application 208 may store a two-dimensional coordinate for each vertex of the geometric object, where the two-dimensional coordinate is relative to the street-level image. In this manner, when a street-level image is provided to a user where the dynamic entertainment information system 102 has identified a marquee in the street-level image, the corresponding properties for the geometric shape in which entertainment information is to be displayed may also be retrieved.

Figure 5:
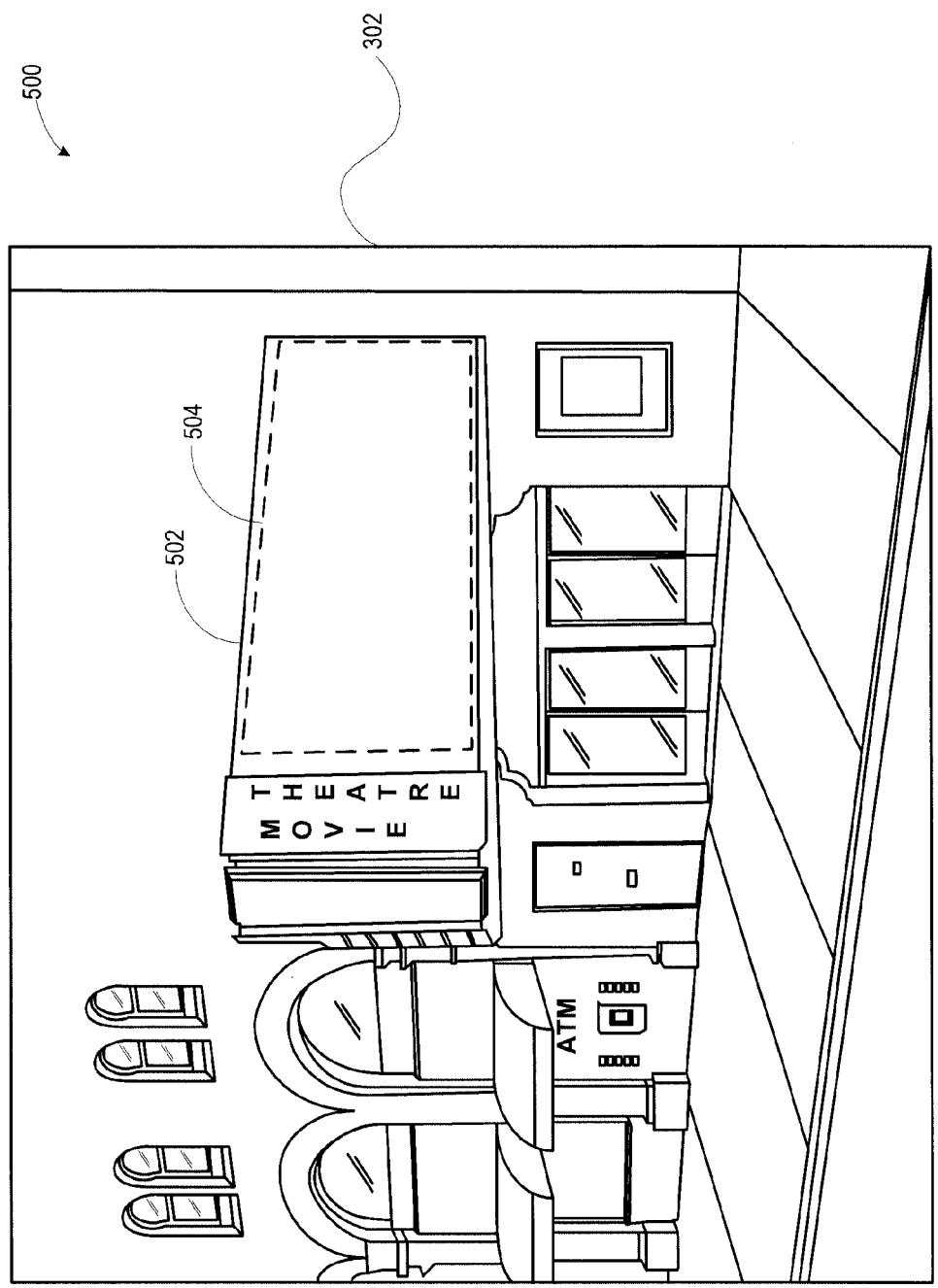
FIG. 5 illustrates one example of the dynamic entertainment information system identifying a marquee using one or more image recognition techniques according to aspects of the disclosure.

FIG. 5 illustrates one example 500 where the marquee image recognition application 208 has identified a marquee 502 in a street-level image 302 of an entertainment venue. The marquee image recognition application 208 may identify a geometric object 504 defining the marquee 502, where the marquee image recognition application 208 identifies the geometric object 504 as being suitable for displaying entertainment information. In defining the geometric object 504, the marquee image recognition application 208 may define one or more vertices based on their relative two-dimensional position within the street-level image 302. As discussed previously, the properties of the defined geometric object 504, such as the position of one or more vertices, the height of the geometric object 504, the width of the geometric object 504, and other such properties, may be stored in the marquee image database 214.

Moreover, the properties of the defined geometric object 504 may be associated with the particular street-level image 302 such that when the particular street-level image 302 is retrieved, the properties of the defined geometric object 504 may also be retrieved. Furthermore, in instances where the same entertainment venue is visible from different perspectives of different street-level images, each of the street-level images may be associated with different sets of geometric object properties (e.g., where the viewing perspective of the entertainment venue's marquee is different, the properties of the geometric object defining the marquee may also be different.)

In addition, the marquee image recognition application 208 may define different regions of the defined geometric object 504 for displaying different entertainment information. For example a first region of the defined geometric object 504 may display movies being played at a movie theatre and a second region of the defined geometric object 504 may display the movie actors appearing in said movies. Hence, by dividing a defined geometric object 504 into various regions multiple different types of entertainment information may be displayed within a street-level image 302 that may not normally be possible.

Referring back to FIG. 2, the dynamic entertainment information system 102 may also facilitate the retrieval and display of current or up-to-date entertainment information. In one embodiment, the dynamic entertainment information system 102 may include an entertainment information retrieval application 210 and a user-provided entertainment information application 212. The entertainment information retrieval application 210 and/or the user-provided entertainment information application 212 may be operative to store entertainment information in the entertainment information database 216.

The entertainment information retrieval application 210 may be operative to retrieve and/or receive entertainment information from one or more sources of entertainment information. For example, the entertainment information retrieval application 210 may be operative to receive entertainment information from an aggregation server 116. In this example, the entertainment information retrieval application 210 may include an interface accessible by the aggregation server 116 for providing entertainment information, or the entertainment information retrieval application 210 may be automated to automatically communicate with the aggregation server 116 using one or more communication protocols (e.g., HTTP, File Transfer Protocol ("FTP"), Simple Object Access Protocol ("SOAP"), etc.).

The entertainment information retrieval application 210 may also be operative to retrieve and/or receive entertainment information from other types of entertainment information sources. In one embodiment, the entertainment information retrieval application 210 may be operative to retrieve webpages related to an entertainment venue, and determine whether the retrieved webpages include current or up-to-date entertainment information for the related entertainment venue. To determine whether the webpages include entertainment information related to the entertainment venue, the entertainment information retrieval application 210 may perform text-based processing on the webpages, such as keyword searching, pattern recognition, or other such techniques. The entertainment information retrieval application 210 may be programmed or scripted to search for specific entertainment information, such as performance group names, scheduling information, opening and/or closing times, a starting time (e.g., such as the starting time for when a movie starts), or other such entertainment information.

In receiving and/or retrieving entertainment information, the dynamic entertainment information system 102 may define one or more limits for whether entertainment information is current or up-to-date. For example, the dynamic entertainment information system 102 may define that entertainment information is current when the entertainment information has been provided or retrieved within a predetermined time limit. In this regard, the dynamic entertainment information system 102 may define that entertainment information is current for a 5-day period after the entertainment information has been received and/or retrieved. After the expiration of this 5-day period, the dynamic entertainment information system 102 may consider the entertainment information not current (e.g., "stale"), and may undertake the process of updating the entertainment information. Updating the entertainment information may include, but is not limited to, retrieving entertainment information from aggregation sources 116, soliciting business owners 114 or users for entertainment information, searching webpages of a server for entertainment information, or combinations thereof.

Additionally, the dynamic entertainment information system 102 may provide real-time or relatively instantaneous entertainment information. For example, when the online map provider 104 provides a street-level image associated with a marquee that is to provide entertainment information, the dynamic entertainment information system 102 may communicate with an entertainment information source and provide the entertainment information at the time the street-level image is requested. In this manner, the provided entertainment information may be the "most current" entertainment information available and/or accessible by the dynamic entertainment information system 102.

In addition to using an automated retrieval/receipt process via the entertainment information retrieval application 210, the dynamic entertainment information system 102 may also employ a user-provided entertainment information application 212 for receiving entertainment information provided by one or more users. In one embodiment, user-provided entertainment information application 212 may prompt a user to provide entertainment information for a given entertainment venue. For example, when a street-level image of an entertainment venue is transmitted to a user device (e.g., any of client devices 106-110), the dynamic entertainment information system 102 may first query the entertainment information database 216 to determine whether the to-be-transmitted street-level image is associated with entertainment information. The dynamic entertainment information system 102 may also query the marquee image database 214 to determine whether a geometric shape and/or marquee object is associated with the to-be-transmitted street-level image.

Should the dynamic entertainment information system 102 determine that there is no entertainment information associated with the street-level image, or that the entertainment information associated with the street-level image is outdated, the dynamic entertainment information system 102 may invoke the user-provided entertainment information application 212 to prompt the user to provide entertainment information for a given venue. In one embodiment, the user-provided entertainment information application 212 may be embedded in the webpage provided to the user device that includes the street-level image, and the user-provided entertainment information application 212 may provide a text field, a text box, radio button selections, or any other type of input field for the user to provide entertainment information regarding a given entertainment venue.

The user-provided entertainment information application 212 may also be a continuously running application that monitors one or more social networks for users providing entertainment information. For example, the user-provided entertainment information application 212 may recognize particular commands, and these particular commands may instruct the dynamic entertainment information system 102 to update the entertainment information database 216 with provided entertainment information. One example of social network is Twitter, and the dynamic entertainment information system 102 may be integrated with a Twitter "feed." In this regard, the dynamic entertainment information system 102 may have a username (e.g., "DEIS"), and may recognize commands preceded by a hashtag (e.g., "#") that instruct the dynamic entertainment information system 102 to update entertainment information for a given entertainment venue. One example of such a prompt may be "@DEIS 123 Main Street is showing Alfred Hitchcock movies! #updateentertainment." This prompt may instruct the dynamic entertainment information system 102 to update the entertainment information for the entertainment venue at 123 Main Street to reflect that the entertainment venue is showing Alfred Hitchcock movies.

Integrations with other social networks may also be possible, such as the Facebook social network, the Google+ social network, the MySpace social network, or other such social networks. Other forms of communicating with the dynamic entertainment information system 102 are also possible, such as an interactive voice interface ("IVR"). Thus, regardless of the medium, the user-provided entertainment information application 212 may facilitate interactions with the public and the dynamic entertainment information system 102.

Figure 6:
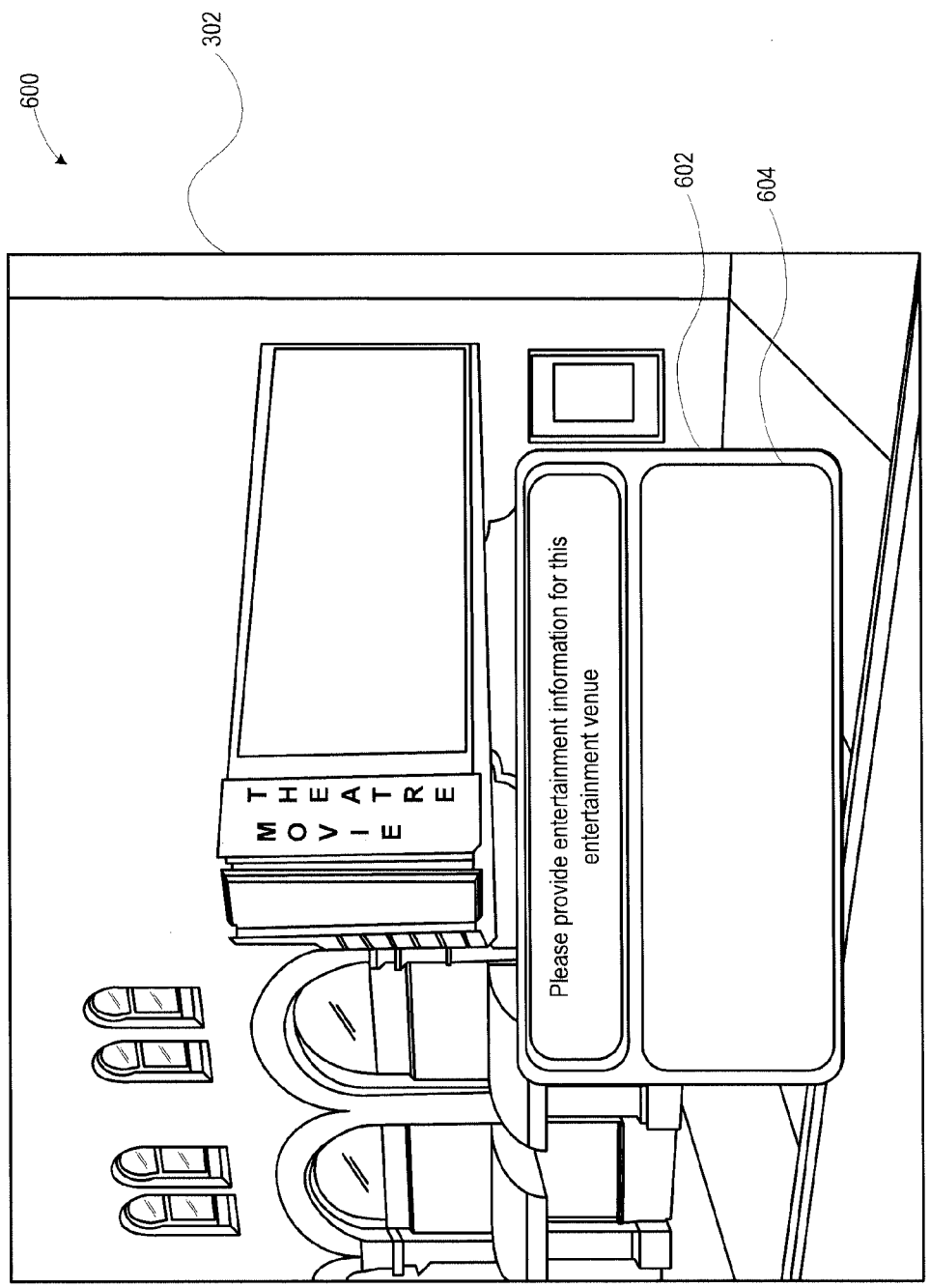
FIG. 6 illustrates an exemplary street-level image including a prompt for a user to provide entertainment information.

FIG. 6 illustrates one example 600 of a street-level image 302 that includes a prompt 602 for the user to provide entertainment information. The provided street-level image 302 may further include an input field 604, such as a text field, for the user to provide the entertainment information. Although the prompt shown in FIG. 6 presents a text field, it should be understood that the prompt 602 may further prompt a user (or business owner) to further classify the provided entertainment information. For example, the prompt 602 may present one or more options for the user to classify the provided entertainment information. Examples of classifications include "movie," "ballet," "basketball game," or other such classifications. Moreover, the provided classifications may depend on the type of entertainment venue (e.g., the entertainment information options for a street-level image of a movie theatre may differ from the entertainment information options of a sports area). In addition, a moderator (such as a human moderator, computerized moderator, or combinations thereof) may moderate the provided entertainment information to ensure the accuracy and/or veracity of the provided entertainment information.

After retrieving and/or receiving the entertainment information from the entertainment information retrieval application 210 and/or the user-provided entertainment information application 212, the retrieved and/or received entertainment information may be stored in the entertainment information database 216. Furthermore, the stored entertainment information may be associated with a street-level image. In this regard, when a street-level image is provided to a user, the dynamic entertainment information system 102 may retrieve the entertainment information from the entertainment information database 216, and the retrieved entertainment information may be displayed within the street-level image.

Moreover, the retrieved entertainment information may be adjusted to conform to the entertainment information display regions within the street-level image. As discussed previously, the dynamic entertainment information system 102 may be operative to store properties for a defined geometric shape in the marquee image database 214 associated with a street-level image. Using the stored properties of the defined geometric shape, the dynamic entertainment information system 102 may determine whether the entertainment information stored in the entertainment information database 216 is displayable within the geometric shape.

For example, the dynamic entertainment information system 102 may determine that a geometric shape for a given street-level image is 200 pixels in height and 400 pixels in width. However, the dynamic entertainment information system 102 may determine that the stored entertainment information requires a geometric shape 600 pixels in height and 400 pixels in width to be fully displayable (completely viewable within the street-level image). Since the entertainment information requires a larger geometric shape to be displayable, the dynamic entertainment information system 102 may define a pixel size (e.g., a font size) for the entertainment information such that the entirety of the entertainment information is displayable within the defined geometric shape. In this regard, the dynamic entertainment information system 102 may communicate the pixel size to the online map provider 104 such that when the street-level image is displayed on one or more client devices 106-110, the entertainment information is displayed on the client devices 106-110 with the pixel size defined by the dynamic entertainment information system 102.

Furthermore, the dynamic entertainment information system 102 may define one or more properties for the geometric shape in which the entertainment information is to be displayed. For example, the dynamic entertainment information system 102 may define that the geometric shape is "multi-line" or "scrollable." In this regard, "multi-line" or "scrollable" indicates to a client device that a given geometric shape is capable of displaying text that may be initially hidden to a viewer (e.g., requiring the user to scroll to the hidden text in order for the hidden text to be displayed).

Figure 7:
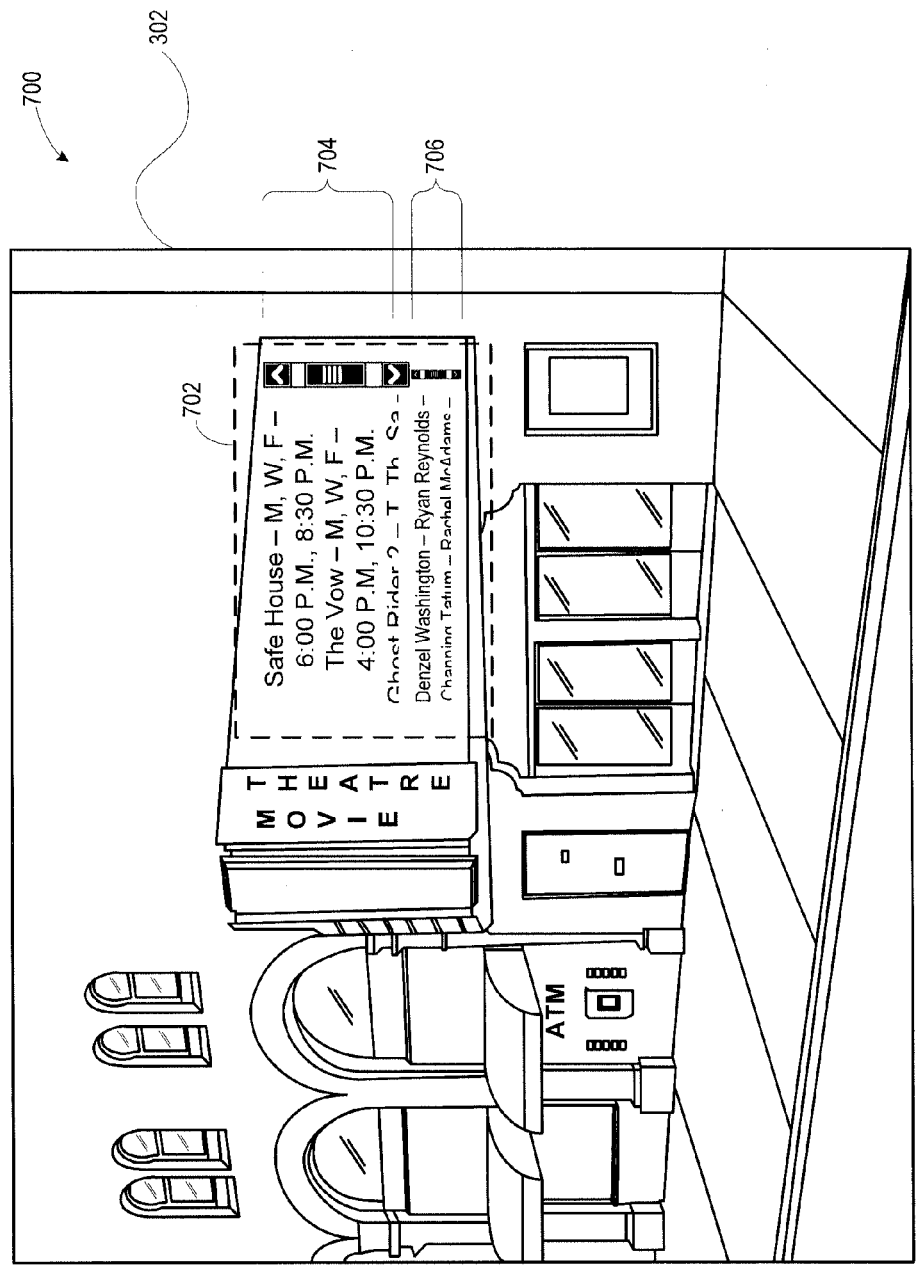
FIG. 7 illustrates an example of a street-level image displaying dynamic entertainment information according to aspects of the disclosure.

FIG. 7 illustrates one example 700 of the street-level image 302 where the dynamic entertainment information system 102 has defined a geometric shape 702 in which entertainment information is displayed as "scrollable." Moreover, as shown in FIG. 7, the geometric shape 702 may be divided into one or more regions (in the example shown in FIG. 7, the geometric shape 702 is divided into two regions 704, 706). In each region 704, 706, different types of entertainment information are displayed. In the first region 704, the first type of entertainment information may be the performances being performed at the entertainment venue (e.g., the movies being shown at a movie theatre). In the second region 706, the second type of entertainment information may be the actors (or sports players, ballet performers, etc.) that are performing in said performances. Each of the types of entertainment information shown in the regions 704, 706 may be stored in the entertainment information database 216 and associated with the street-level image 302 and/or the geometric shape 702.

In addition, one or more portions of the geometric shape 702 may be selectable by a user such that selecting the selectable portion of the geometric shape 702 causes the display of additional information regarding the selected portion. In one embodiment, a selected portion of the geometric shape 702, such as the name of a movie in the first region 704, is associated with a hyperlink, and selection of the hyperlink causes the display of a webpage regarding the selected movie. For example, selection of a movie name may cause the display of a webpage publicizing the movie. In another embodiment, selection of the hyperlink may cause a graphic to be overlaid the street-level image 302, where the overlaid graphic includes additional information about the selected movie. Furthermore, the hyperlink may be customizable by the business owner of the entertainment venue, such that selection of the hyperlink causes the display of a webpage (or graphic) facilitating the online purchase of tickets to the selected performance. Other types of information may also be associated with the hyperlink, such as movie trailers, television clips, news stories, audio clips, or other types of media and/or information. The hyperlink may be stored in the entertainment information database 216 and may be associated with a particular portion of the entertainment information, a particular portion of the geometric shape 702 defining where the entertainment information should be displayed, or combinations thereof.

While FIG. 7 illustrates an example of a movie theatre and movie names, it is foreseeable that the foregoing may be extended to other entertainment venues and performances, such as sports stadiums, performing arts theatres, or other types of information associated with buildings, billboards, or other structures. Thus, regardless of the entertainment venue displayed in the street-level image 302, one or more portions of the street-level image 302 may be associated with a hyperlink that provides additional information about a selected performance displayed in the street-level image 302. In this manner, the dynamic entertainment information system 102 assists both the user and the business owner of the entertainment venue: the user is able to learn more about a given performance at an entertainment venue and the business owner may experience an increase in ticket sales for an entertainment venue because of this enhanced user experience.

Figure 8:
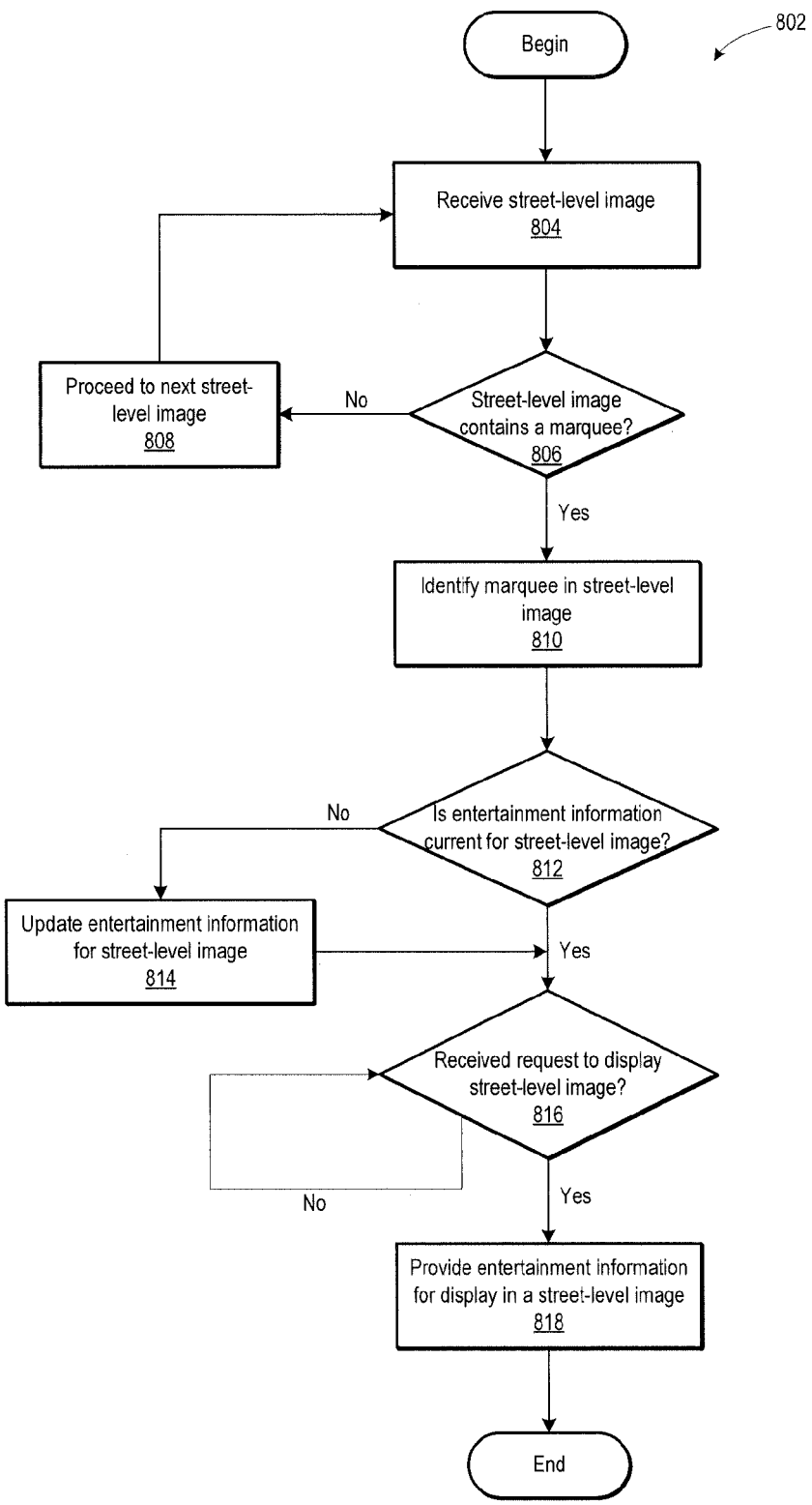
FIG. 8 illustrates a flow diagram for processing and displaying dynamic entertainment information according to aspects of the disclosure.

FIG. 8 illustrates one example of logic flow 802 for processing and displaying dynamic entertainment information according to aspects of the disclosure. In one embodiment, the dynamic entertainment information system 102 may receive a street-level image from the online map provider 104 to determine whether the street-level image is an image where dynamic entertainment information should be displayed (Block 804). As discussed previously, the dynamic entertainment information system 102 may receive the street-level image via the network 118.

The dynamic entertainment information system 102 may then perform one or more types of processing on the street-level image to determine whether the street-level image contains a marquee or other signage in which dynamic entertainment information should be displayed (Block 806). To this end, the dynamic entertainment information system 102 may perform image recognition on the street-level image, may request a user or a business owner to identify the marquee or signage in the street-level image, or may perform a combination of these techniques. In the event that the dynamic entertainment information system 102 should determine that the street-level image does not contain a marquee or other signage, the dynamic entertainment information system 102 may proceed to the next street-level image for processing. In this regard, the dynamic entertainment information system 102 may request another street-level image for processing from the online map provider 104, or the dynamic entertainment information system 102 may wait until called upon by the online map provider 104 to process another street-level image.

Where the dynamic entertainment information system 102 determines that a marquee or another signage exists in the street-level image, the dynamic entertainment information may identify the marquee or signage accordingly (Block 810). In one embodiment, the dynamic entertainment information system 102 may identify a geometric shape corresponding to the marquee or signage. The properties for the geometric shape may be stored in the marquee image database 214. As discussed previously, the geometric shape may be identified using image processing techniques via the marquee image recognition application 208 or may be identified by a user via the marquee image editor 206. A combination of the foregoing is also possible, such as where the marquee image recognition application 208 in initially identifies the geometric shape, and then a user refines the geometric shape via the marquee image editor 206.

The dynamic entertainment information system 102 may then determine whether there is current entertainment information for the street-level image (Block 812). The dynamic entertainment information system 102 may first query the entertainment information database 216 to determine whether there is entertainment information for the street-level image. If there is no entertainment information for the street-level image, the dynamic entertainment information system 102 may attempt to gather and/or retrieve entertainment information for the street-level image via the entertainment information retrieval application 210, the user-provided entertainment information application 212, or combinations of the foregoing.

However, should the dynamic entertainment information system 102 determine that there is entertainment information for the street-level image, but that the entertainment information is outdated (e.g., older than a predetermined time period), the dynamic entertainment information system 102 may then update the stored entertainment information (Block 814). As with initially populating the entertainment information database 216, the dynamic entertainment information system 102 may leverage the entertainment information retrieval application 210 and/or the user-provided entertainment information application 212 to update the stored entertainment information. As previously discussed, depending on the source of the entertainment information, the dynamic entertainment information system 102 may overwrite and/or supplement the stored entertainment information with the entertainment information from a given source (e.g., entertainment information from a business owner of an entertainment venue may overwrite and/or supplement the entertainment information from a visitor of the entertainment venue).

The dynamic entertainment information system 102 may then wait for a request to display the street-level image with the entertainment information (Block 816). When a request is received, the dynamic entertainment information system 102 may provide the entertainment information for display in a street-level image (Block 818). In providing the entertainment information, the dynamic entertainment information system 102 may also retrieve one or more properties of the geometric shape in which the entertainment information is to be displayed from the marquee image database 214. As discussed previously, the geometric shape may define where the entertainment information is to be displayed in a street-level image. Moreover, the dynamic entertainment information system 102 may adjust one or more properties of the geometric shape and/or the entertainment information so that the entertainment information is displayable within the geometric shape. For example, the dynamic entertainment information system 102 may define that the geometric shape is "scrollable" or may define the font size of the entertainment information. The dynamic entertainment information system 102 may also retrieve hyperlinks associated with the entertainment information that may be selectable within the displayed street-level image.

In this manner, the dynamic entertainment information system 102 facilitates the display of current or up-to-date entertainment information for a street-level image requested by a user. Moreover, because the dynamic entertainment information system 102 leverages various types of sources of entertainment information, the dynamic entertainment information system 102 increases the likelihood that the entertainment information provided with a street-level image is accurate. Furthermore, because the dynamic entertainment information system 102 is flexible with regard to the type of entertainment information it stores, the dynamic entertainment information system 102 may provide hyperlinks or other selectable media to a user when a street-level image is requested. Hence, the dynamic entertainment information system 102 provides an enhanced and more enjoyable experience to a user when a user is viewing street-level images of entertainment venues.

As these and other variations and combinations of the features discussed above can be utilized without departing from the subject matter as defined by the claims, the foregoing description of the exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus for providing street-level images of entertainment information, the apparatus comprising:
 a memory storing at least one street-level image of an entertainment venue; and
 one or more processors in communication with the memory, the one or more processors being configured to:
  receive location information for a geographic location corresponding to a geographic location of a sign displayable within the at least one street-level image;
  identify a first region within the displayable sign where first entertainment information is displayable, the first entertainment information relating to a performance being performed at the geographic location;
  determine whether the first entertainment information is current;
  when the first entertainment information is not current, receive second entertainment information for display within the first region, wherein the second entertainment information is more current than the first entertainment information; and
  provide the at least one street-level image of the entertainment venue to a client device, wherein the at least one street-level image includes the second entertainment information displayed within the identified first region within the displayable sign.

2. The apparatus of claim 1, wherein the second entertainment information is derived from user-provided entertainment information.

3. The apparatus of claim 1, wherein the one or more processors are further configured to:
 identify a second region with the displayable sign where third entertainment information is displayable;
 receive the third entertainment information for display within the second region; and
 provide the at least one street-level image of the entertainment venue to the client device that includes the third entertainment information displayed within the identified second region within the displayable sign, wherein the second entertainment information and the third entertainment information are different.

4. The apparatus of claim 1, wherein:
 the memory is further operative to store a geometry that defines the first region; and
 the one or more processors are further configured to identify the first region based on the stored geometry.

5. The apparatus of claim 1, wherein the one or more processors are further configured to identify the first region based on at least one image recognition technique.

6. The apparatus of claim 1, wherein a portion of the second entertainment information is selectable by a user, the selectable portion of the second entertainment information being associated with a displayable webpage.

7. The apparatus of claim 1, wherein the second entertainment information includes at least one performance date and at least one performance time for a performance being held at the entertainment venue displayable within the street-level image.

8. The apparatus of claim 1, wherein the second entertainment information is replaceable with third entertainment information, wherein the third entertainment information is different than the second entertainment information.

9. The apparatus of claim 1, wherein the processor is further operative to replace the first entertainment information with the second entertainment information at a predetermined time interval.

10. The apparatus of claim 1, wherein:
 the second entertainment information is received from a first entertainment information source; and
 the one or more processors are further configured to replace the second entertainment information with third entertainment information received from a second entertainment information source, wherein the second entertainment information source provides identification information different than identification information provided by the first entertainment information source.

11. The apparatus of claim 1, wherein:
 the displayable sign is a movie marquee; and
 the second entertainment information for display is movie information for a movie being shown at a movie theatre associated with the movie marquee.

12. The apparatus of claim 1, wherein the second entertainment information includes a hyperlink to a webpage for purchasing tickets to a performance associated with the second entertainment information.

13. The apparatus of claim 1, wherein the processor is further operative to replace the first entertainment information with the second entertainment based on a comparison of the first entertainment information with the second entertainment information.

14. The apparatus of claim 13, wherein the first entertainment information is replaced with the second entertainment information when the one or more processors determines that the second entertainment information is different than the first entertainment information based on the comparison.

15. The apparatus of claim 13, wherein the first entertainment information is replaced when a request to replace the first entertainment information is received.

16. The apparatus of claim 1, wherein the second entertainment information is derived from a social network.

17. An apparatus for displaying a street-level image that includes current entertainment information, the apparatus comprising:
 a memory operative to store a street-level image, the street-level image including a displayable sign having a region for displaying first entertainment information; and
 one or more processors in communication with the memory, the one or more processors being configured to:
  receive the street-level image based on a request from a user to display the street-level image;
  receive second entertainment information for display within the first region, wherein the second entertainment information includes more current entertainment information than the first entertainment information; and
  display the street-level image with the second entertainment information displayed in the region of the displayable sign, the second entertainment information having replaced the first entertainment information.

18. The apparatus of claim 17, wherein the second entertainment information is derived from a social network.

19. A method for displaying a street-level image that includes current entertainment information, the method comprising:
- storing, by one or more processors, in a memory, a street-level image based on a request from a user to display the street-level image, wherein the street-level image includes a displayable sign having a region for displaying first entertainment information;
- receiving, by the one or more processors, in communication with the memory, second entertainment information for display within the first region, wherein the second entertainment information includes more current entertainment information than the first entertainment information; and
- displaying, by the one or more processors, the street-level image with the second entertainment information displayed in the region of the displayable sign, the second entertainment information having replaced the first entertainment information.

20. The method of claim 19, wherein the second entertainment information is derived from a social network.

\* \* \* \* \*